May 15, 1934.                R. M. STEPHENS                1,959,180
                              ELECTRODE NOZZLE
                           Filed Sept. 19, 1933
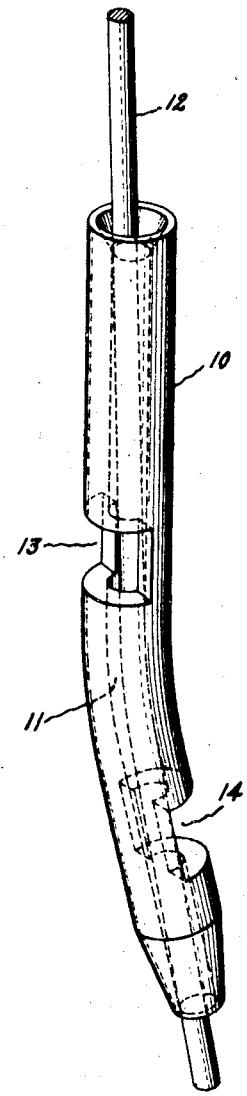
Inventor:
Robert M. Stephens,
by Harry E. Dunham
His Attorney.

Patented May 15, 1934

1,959,180

UNITED STATES PATENT OFFICE 1,959,180

ELECTRODE NOZZLE

Robert M. Stephens, Scotia, N. Y., assignor to General Electric Company, a corporation of New York Application September 19, 1933, Serial No. 690,058

5 Claims. (Cl. 219—8)

My invention is particularly applicable to that form of welding known as metallic arc welding in which the arc is maintained between a metallic electrode and the work.

It has already been proposed to supply welding current to a metallic electrode near its arcing terminal through the agency of a nozzle or delivery member provided with an opening constructed to bend the electrode as it passes therethrough and thus force it into good electrical contact with the nozzle which is connected in the welding circuit. When employing such a construction, however, faulty operation often results when the electrode is coated with scale or fluxing material fragments of which are dislodged therefrom as it is fed through the curved passage in the nozzle. The accumulated fragments either cause the electrode to jam in the nozzle or else produce an arcing contact between the electrode and the nozzle which eventually causes the electrode to jam therein.

It is an object of my invention to provide a nozzle of the construction above described which has been modified to adapt it for feeding electrodes having surface coatings which may become dislodged therefrom.

My invention will be better understood from the following description taken in connection with the accompanying drawing which shows in perspective a nozzle of my improved construction.

Referring to the drawing the nozzle illustrated at 10 is provided with a curved passageway or conduit 11 through which the electrode 12 is fed during the welding operation. By reason of the curved passageway the electrode is forced into good electrical contact with the nozzle as illustrated in the drawing. The nozzle is also provided with openings 13 and 14 extending in opposite radial directions from the passageway 11 and connecting therewith at the beginning and end of its curved portion. These openings are of sufficient size to discharge fragments of the surface coating of the electrode dislodged therefrom when passing through the nozzle. These openings are preferably located in such a position as not to interfere with the operation of inserting an electrode into the nozzle. It is for this reason that opening 14 has been placed opposite the portion of the curved surface of the passageway 11 into which the end of the electrode 12 is forced in its passage therethrough.

The electrode delivery nozzle should be made of fairly hard material in order to withstand the abrading action of the electrode. I have found that brass is a very satisfactory material out of which to make the nozzle. When the nozzle becomes much worn by long use it may be readily replaced at small expense by inserting a new nozzle.

In the drawing the support for the nozzle 10 has not been illustrated. It is to be understood that it forms a part of an automatic or semi-automatic welding machine to which it is attached by a suitable clamping means which may also serve to connect the nozzle to the welding circuit.

While the nozzle illustrated in the drawing is in the form of a bent tube, its construction is not limited to this tubular form since other constructions may be used so long as the opening or passageway in the nozzle is constructed to bend the electrode as it passes therethrough, or suitable deflecting means are employed so that the nozzle and electrode are forced into good electrical contact with one another. It is also to be understood that the points of contact between the electrode 12 and the nozzle 10 are not of necessity those illustrated in the drawing, since the points of contact vary depending upon the size and flexibility of the electrode, the construction of the nozzle and the direction in which the electrode is fed into the nozzle.

Thus, while I have shown and described but one embodiment of my invention for the purpose of explaining its principle, it is to be understood that other constructions and arrangements will occur to those skilled in the art, and I, therefore, wish to cover by the following claims all modifications which fall within the true spirit and scope of my invention.

What I claim as new and desire to secure by Letters Patent of the United States is:

1. An electrode nozzle having a passageway by means of which an electrode is directed therethrough and having an opening extending into said passageway intermediate its end by means of which portions of a coating dislodged from said electrode in passing through said nozzle are discharged from said nozzle independently of said passageway.

2. An electrically conductive electrode nozzle having a curved passageway by means of which an electrode fed therethrough is directed into electrically conductive engagement therewith and having an opening extending into said passageway, said opening being large enough to discharge those portions of a coating dislodged from said electrode in passing through said nozzle.

3. In welding apparatus, an electrode delivery member for supplying current to an electrode as it is fed toward the work, said member having a plurality of openings therein one of which is constructed to bend an electrode as it passes therethrough and thereby force it into good electrical contact with the inside surface of said opening and another of which communicates with said first-mentioned opening opposite the surface thereof into which the end of the electrode is forced in its passage therethrough.

4. An electrically conductive electrode nozzle having a curved passageway therein by means of which an electrode fed therethrough is directed into electrically conductive engagement therewith and having openings in its sides extending in opposite radial directions from said passageway at the beginning and end of the curved portion thereof.

5. In welding apparatus a delivery member for electrodes having a surface coating separable therefrom, said member being provided with an electrode conduit, means for deflecting an electrode fed therethrough into electrically conductive engagement therewith, and means for discharging electrode coating material from said deflecting means to the exterior of said member.

ROBERT M. STEPHENS.